United States Patent
Hagari

(10) Patent No.: US 9,638,119 B2
(45) Date of Patent: May 2, 2017

(54) CONTROL APPARATUS AND CONTROL METHOD FOR AN INTERNAL COMBUSTION ENGINE

(71) Applicant: Mitsubishi Electric Corporation, Tokyo (JP)

(72) Inventor: Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 106 days.

(21) Appl. No.: 14/819,558

(22) Filed: Aug. 6, 2015

(65) Prior Publication Data
US 2016/0146137 A1    May 26, 2016

(30) Foreign Application Priority Data
Nov. 20, 2014 (JP) .................. 2014-235373

(51) Int. Cl.
*F02D 41/00* (2006.01)
*F02B 47/08* (2006.01)
*F02D 41/14* (2006.01)

(52) U.S. Cl.
CPC ..... *F02D 41/0072* (2013.01); *F02D 41/0002* (2013.01); *F02D 41/145* (2013.01); *F02D 41/1447* (2013.01); *F02D 2041/001* (2013.01); *F02D 2041/002* (2013.01); *F02D 2041/0017* (2013.01); *F02D 2200/0406* (2013.01);
(Continued)

(58) Field of Classification Search
CPC ............ F02D 41/0072; F02D 41/0002; F02D 41/145; F02D 41/1447; F02D 41/0077; F02D 41/0097; F02D 41/263; F02D 41/1446; F02D 41/18; F02D 41/2464; F02D 41/32; F02D 41/0062; F02D 2041/001; F02D 2041/0017; F02D 2041/002; F02D 2041/007; F02D 2200/0604; F02D 2200/101; F02M 25/0753; F02M 26/47; G01F 1/34; G01F 9/00
USPC ................... 73/114.74; 123/568.26; 701/108
See application file for complete search history.

(56) References Cited

U.S. PATENT DOCUMENTS 6,098,602 A * 8/2000 Martin ................ F02D 41/0072
123/568.23
6,687,600 B2 * 2/2004 Russell ............... F02D 41/0072
123/478
(Continued)

FOREIGN PATENT DOCUMENTS

JP    3861046 B2    12/2006
JP    4019265 B2    12/2007

*Primary Examiner* — Thomas Moulis
*Assistant Examiner* — George Jin
(74) *Attorney, Agent, or Firm* — Sughrue Mion, PLLC; Richard C. Turner

(57) ABSTRACT

A basic EGR flow rate calculation part calculates a basic EGR flow rate based on an intake manifold pressure, which is a pressure in an intake manifold, an exhaust pressure, which is a pressure in an exhaust pipe, an exhaust temperature, which is a temperature in the exhaust pipe, and an opening degree of an EGR valve. An EGR flow rate correction part corrects the basic EGR flow rate based on an intake manifold pressure ratio, which is a ratio between the intake manifold pressure and the exhaust pressure, and an exhaust VVT phase angle of an exhaust VVT mechanism, to thereby calculate a corrected EGR flow rate as an EGR flow rate.

13 Claims, 9 Drawing Sheets

(52) U.S. Cl.
CPC .. *F02D 2200/101* (2013.01); *F02D 2200/703* (2013.01); *Y02T 10/42* (2013.01); *Y02T 10/47* (2013.01)

(56) References Cited

U.S. PATENT DOCUMENTS

| | | | | |
|---|---|---|---|---|
| 7,305,967 B1* | 12/2007 | Hagari | ................... | F02D 9/02 |
| | | | | 123/403 |
| 2002/0100463 A1* | 8/2002 | Jaliwala | .............. | F02D 41/0072 |
| | | | | 123/568.21 |
| 2004/0089061 A1* | 5/2004 | Matsunaga | ......... | F02D 41/0072 |
| | | | | 73/114.76 |
| 2010/0042284 A1* | 2/2010 | Sasaki | ................. | F02D 41/0072 |
| | | | | 701/31.4 |
| 2012/0117011 A1* | 5/2012 | Hashimoto | ......... | F02D 13/0226 |
| | | | | 706/23 |
| 2013/0245967 A1* | 9/2013 | Hagari | ................... | F02D 41/18 |
| | | | | 702/45 |
| 2013/0255650 A1* | 10/2013 | Kim | ................. | F02M 25/0753 |
| | | | | 123/568.21 |
| 2014/0261344 A1* | 9/2014 | Makino | ............... | F02D 41/1446 |
| | | | | 123/568.26 |

* cited by examiner

CONTROL APPARATUS AND CONTROL METHOD FOR AN INTERNAL COMBUSTION ENGINE

BACKGROUND OF THE INVENTION

1. Field of the Invention

The present invention relates to a control apparatus and a control method for an internal combustion engine, for calculating an exhaust gas recirculation (EGR) flow rate in an internal combustion engine on which variable valve timing (VVT) mechanisms are mounted.

2. Description of the Related Art

In general, in order to preferably control an internal combustion engine (hereinafter also referred to as "engine"), it is important to precisely calculate an air amount taken into a cylinder of the engine (hereinafter referred to as "cylinder intake air amount"), to thereby carry out fuel control and ignition timing control in response to the cylinder intake air amount.

On this occasion, as a method of calculating the cylinder intake air amount, there are generally known a method of using an airflow sensor (AFS) for calculation (hereinafter referred to as "AFS method") and a method of using an intake manifold pressure sensor for calculation (hereinafter referred to as "speed density (S/D) method").

Specifically, in the AFS method, the AFS mounted on an intake pipe of the engine on a throttle upstream side is used to measure an air flow rate passing through an mounted portion of the AFS (hereinafter referred to as "AFS intake air amount"), and the cylinder intake air amount is calculated while considering a response lag on a throttle downstream side.

Moreover, in the S/D method, an intake manifold pressure sensor mounted to a surge tank and an intake manifold on the throttle downstream side of the intake pipe is used to measure a pressure in the intake manifold (hereinafter referred to as "intake manifold pressure"), and the cylinder intake air amount is calculated based on the intake manifold pressure and the engine rotational speed.

Note that, there are known a technology of switching between the AFS method and the S/D method depending on an operation state by using both the AFS and the intake manifold pressure sensor, and a technology of increasing a precision of the response lag on the throttle downstream side by using the intake manifold pressure even in the AFS method.

Moreover, regarding the fuel control, generally excellent controllability can be obtained by carrying out acceleration/deceleration correction and feedback control so as to inject a fuel amount for attaining a target air/fuel ratio mainly for the cylinder intake air mount.

On the other hand, the ignition timing control needs to be carried out so as to attain an ignition advance angle providing the maximum engine output (minimum spark advance for best torque (MBT)) depending on not only the engine rotational speed and the cylinder intake air amount but also other factors such as an engine temperature, a knock generation state, fuel characteristics, and an EGR ratio, which is a ratio between an EGR amount and the AFS intake air amount.

Moreover, out of the above-mentioned factors affecting the MBT, for example, the engine temperature can be detected by an engine coolant temperature sensor, the knock generation state can be detected by a knock sensor, and the fuel characteristics of whether the fuel is a regular gasoline or a high-octane gasoline can be determined depending on the knock generation state.

On this occasion, regarding the EGR rate, there are known external EGR control for controlling an EGR amount in an EGR passage connecting between the exhaust pipe and the intake pipe and internal EGR control for controlling an EGR amount by using exhaust gas remaining in the cylinder. The external EGR control and the internal EGR are commonly used simultaneously.

Specifically, in the external EGR control, an EGR valve is mounted on the EGR passage, and the EGR amount is controlled based on an opening degree of the EGR valve. Moreover, in the internal EGR control, VVT mechanisms for changing valve opening/closing timings of an intake valve and an exhaust valve are mounted, and an overlap period during which the intake valve and the exhaust valve are simultaneously opened is changed based on the valve opening/closing timings, to thereby control the EGR amount caused by the exhaust gas remaining in the cylinder.

In the following, a simple notation of EGR refers to the EGR introduced by the external EGR control, and a flow rate (hereinafter referred to as "EGR flow rate") Qegr of the EGR gas introduced by the external EGR control can be calculated by, for example, Expression (1) based on a calculation equation for the flow rate passing through a nozzle in the compressible fluid dynamics.

$$Q_{egr} = S_{egr} \cdot \alpha_{egr} \cdot \sigma_{egr} \cdot \rho_{egr} \tag{1}$$

In Expression (1), Segr denotes an effective opening area of the EGR valve, αegr denotes the sound speed of the EGR gas, σegr denotes a dimensionless flow rate of the EGR gas, and ρegr denotes the density of the EGR gas. Moreover, the effective opening area Segr of the EGR valve is calculated as a correlation value of the EGR valve opening degree.

Moreover, the sound speed αegr of the EGR gas can be calculated by using Expression (2).

$$\alpha_{egr} = \sqrt{\kappa_{egr} \cdot R_{egr} \cdot T_{egr}} \tag{2}$$

In Expression (2), κegr denotes the specific heat ratio of the EGR gas (such as 1.38), Regr denotes the gas constant of the EGR gas (such as 0.282 [kJ/(kg·K)]), and Tegr denotes the temperature of the EGR gas. Note that, as the temperature Tegr of the EGR gas, a temperature Tex in the exhaust pipe (hereinafter referred to as "exhaust temperature Tex") may be used.

Moreover, the dimensionless flow rate σegr of the EGR gas can be calculated by using Expression (3).

$$\sigma_{egr} = \sqrt{\frac{2}{\kappa_{egr}-1}\left[\left(\frac{P_b}{P_{ex}}\right)^{\frac{2}{\kappa_{egr}}} - \left(\frac{P_b}{P_{ex}}\right)^{\frac{\kappa_{egr}+1}{\kappa_{egr}}}\right]} \tag{3}$$

$$\left(\because P_b \le P_{ex}, \left(\frac{P_b}{P_{ex}}\right)_{choke} = \left(\frac{2}{\kappa_{egr}+1}\right)^{\frac{\kappa_{egr}}{\kappa_{egr}-1}}\right)$$

In Expression (3), Pb denotes the intake manifold pressure and Pex denotes the pressure in the exhaust pipe (hereinafter referred to as "exhaust pressure"). It is conceivable that the exhaust pressure Pex is approximated by the atmospheric pressure Pa for a naturally-aspirated engine.

Moreover, when Pb/Pex is less than (Pb/Pex)choke, the state is in a choke area, and the dimensionless flow rate σegr of the EGR gas on this occasion has the same value as σegr@choke for (Pb/Pex)choke.

Moreover, the density ρegr of the EGR gas can be calculated by using Expression (4).

$$\rho_{egr} = \frac{P_{ex}}{R_{egr} \cdot T_{egr}} \quad (4)$$

In Expression (4), as described above, as the temperature Tegr of the EGR gas, the exhaust temperature Tex may be used.

On this occasion, as a method of calculating the EGR flow rate by using Expressions (1) to (4), for example, there are proposed methods disclosed in Japanese Patent Nos. 4019265 and 3861046.

Specifically, in Japanese Patent No. 4019265, an opening area of an EGR passage is calculated based on an opening degree of an EGR valve, and an EGR flow rate is calculated from a map storing a relationship of an EGR flow rate under a predetermined atmospheric pressure corresponding to an intake pipe internal pressure correlation value, which is acquired by correcting an intake pipe internal pressure detected value with an atmospheric pressure detected value, and an engine rotational speed based on the intake pipe internal pressure correlation value and a detected value of the engine rotational speed. Then, a density correction coefficient is calculated based on the atmospheric pressure detected value, and the EGR flow rate is calculated based on the opening area of the EGR passage, the EGR flow rate, and the density correction coefficient. On this occasion, the above-mentioned relationship corresponds to the product of Expressions (2) to (4) under the predetermined atmospheric pressure.

Moreover, in Japanese Patent No. 3861046, a tentative EGR gas flow rate is calculated by using Expressions (1) to (4), and such a correction value that increases toward 1 as a pressure difference between an upstream gas pressure corresponding to the exhaust pressure and a downstream gas pressure corresponding to the intake manifold pressure increases is acquired. Then, an error contained in the tentative EGR gas flow rate, which is caused by a pipe friction between an exhaust gas recirculation pipe corresponding to the EGR passage and the EGR gas, is corrected by multiplying the tentative EGR gas flow rate by the correction value, to thereby calculate the flow rate of the EGR gas flowing from the exhaust gas recirculation pipe to an intake passage.

However, the related art has the following problems.

Expressions (1) to (4) hold true for a non-viscous ideal gas assuming isentropic conditions. It is considered that, in such a state that the air, which is a mixture of nitrogen and oxygen, and the EGR gas, which is a mixture of nitrogen, carbon dioxide, and vapor, move in the internal combustion engine, influence of a change in entropy and the specific heat is not so great.

Therefore, it is considered that when Expressions (1) to (4) are applied with use of the effective opening area reflecting influence of the viscosity, which corresponds to the product of a flow rate coefficient and the opening area, the EGR flow rate can be calculated without such a large error.

Nonetheless, Japanese Patent No. 4019265 has a description that the product of Expressions (2) to (4) is calculated for each engine rotational speed, and Japanese Patent No. 3861046 has a description that the error caused by the pipe friction between the EGR passage and the EGR gas is corrected by such a correction value that increases toward 1 as the pressure difference between the exhaust pressure and the intake manifold pressure increases.

Those descriptions are considered to suggest that, due to a problem specific to the EGR passage connecting between the exhaust pipe and the intake pipe of the engine, the EGR flow rate cannot be calculated with sufficient precision only by simply applying Expressions (1) to (4).

Thus, the inventor (s) of the present invention calculated the EGR flow rate by applying Expressions (1) to (4) to an engine including an intake VVT mechanism and an exhaust VVT mechanism and configured to carry out external EGR control, and confirmed that the calculation error in the EGR flow rate is increased not only by the engine rotational speed and the pressure difference between the exhaust pressure and the intake manifold pressure, but also by VVT phase angles.

Further, it was found out that, out of the intake VVT and the exhaust VVT, particularly the phase angle of the exhaust VVT has a great influence on the calculation result of the EGR flow rate. On the engine including the intake VVT mechanism and the exhaust VVT mechanism and configured to carry out the external EGR control, there is such a problem that the EGR flow rate cannot be precisely calculated only by the correction based on the engine rotational speed and the pressure difference between the exhaust pressure and the intake manifold pressure.

SUMMARY OF THE INVENTION

The present invention has been made in view of the above-mentioned problem, and therefore has an object to provide a control apparatus and a control method for an internal combustion engine, which are capable of precisely calculating an EGR flow rate in an engine including an intake VVT mechanism and an exhaust VVT mechanism and configured to carry out external EGR control.

According to one embodiment of the present invention, there is provided a control apparatus for an internal combustion engine, including: a throttle mounted to an intake pipe of an internal combustion engine; an intake VVT mechanism and an exhaust VVT mechanism for changing valve opening/closing timings of the internal combustion engine; an EGR passage for connecting between an exhaust pipe of the internal combustion engine and an intake manifold mounted to the intake pipe on a downstream side of the throttle, to thereby introduce apart of exhaust gas into the intake manifold; an EGR valve, which is mounted on the EGR passage, for controlling an EGR flow rate flowing from the EGR passage into the intake manifold; an operation state detection part for detecting an operation state of the internal combustion engine; and an EGR flow rate calculation part for calculating the EGR flow rate, in which the EGR flow rate calculation part includes: a basic EGR flow rate calculation part for calculating a basic EGR flow rate based on an intake manifold pressure, which is a pressure in the intake manifold, an exhaust pressure, which is a pressure in the exhaust pipe, an exhaust temperature, which is a temperature in the exhaust pipe, and an opening degree of the EGR valve; and an EGR flow rate correction part for correcting the basic EGR flow rate based on an intake manifold pressure ratio, which is a ratio between the intake manifold pressure and the exhaust pressure, a rotational speed of the internal combustion engine, and an exhaust VVT phase angle of the exhaust VVT mechanism, to thereby calculate a corrected EGR flow rate as the EGR flow rate.

According to one embodiment of the present invention, there is provided a control method for an internal combustion engine to be executed in an internal combustion engine including: a throttle mounted to an intake pipe of the internal combustion engine; an intake VVT mechanism and an exhaust VVT mechanism for changing valve opening/closing timings of the internal combustion engine; an EGR passage for connecting between an exhaust pipe of the internal combustion engine and an intake manifold mounted to the intake pipe on a downstream side of the throttle, to thereby introduce a part of exhaust gas into the intake manifold; an EGR valve, which is mounted on the EGR passage, for controlling an EGR flow rate flowing from the EGR passage into the intake manifold; and an operation state detection part for detecting an operation state of the internal combustion engine, the control method including: a basic EGR flow rate calculation step of calculating, by a processing part, a basic EGR flow rate based on an intake manifold pressure, which is a pressure in the intake manifold, an exhaust pressure, which is a pressure in the exhaust pipe, an exhaust temperature, which is a temperature in the exhaust pipe, and an opening degree of the EGR valve, and storing the basic EGR flow rate in a memory; and an EGR flow rate correction step of invoking, by the processing part, the basic EGR flow rate from the memory, and correcting the basic EGR flow rate based on an intake manifold pressure ratio, which is a ratio between the intake manifold pressure and the exhaust pressure, a rotational speed of the internal combustion engine, and an exhaust VVT phase angle of the exhaust VVT mechanism, to thereby calculate a corrected EGR flow rate as the EGR flow rate.

According to the control apparatus and the control method for an internal combustion engine of the one embodiment of the present invention, the basic EGR flow rate calculation part (step) calculates the basic EGR flow rate based on the intake manifold pressure, which is the pressure in the intake manifold, the exhaust pressure, which is the pressure in the exhaust pipe, the exhaust temperature, which is the temperature in the exhaust pipe, and the opening degree of the EGR valve, and the EGR flow rate correction part (step) corrects the basic EGR flow rate based on the intake manifold pressure ratio, which is the ratio between the intake manifold pressure and the exhaust pressure, and the exhaust VVT phase angle of the exhaust VVT mechanism, to thereby calculate the corrected EGR flow rate as the EGR flow rate.

Consequently, the EGR flow rate may be precisely calculated in the engine including the intake VVT mechanism and the exhaust VVT mechanism and configured to carry out the external EGR control.

DETAILED DESCRIPTION OF THE PREFERRED EMBODIMENTS

Figure 1:
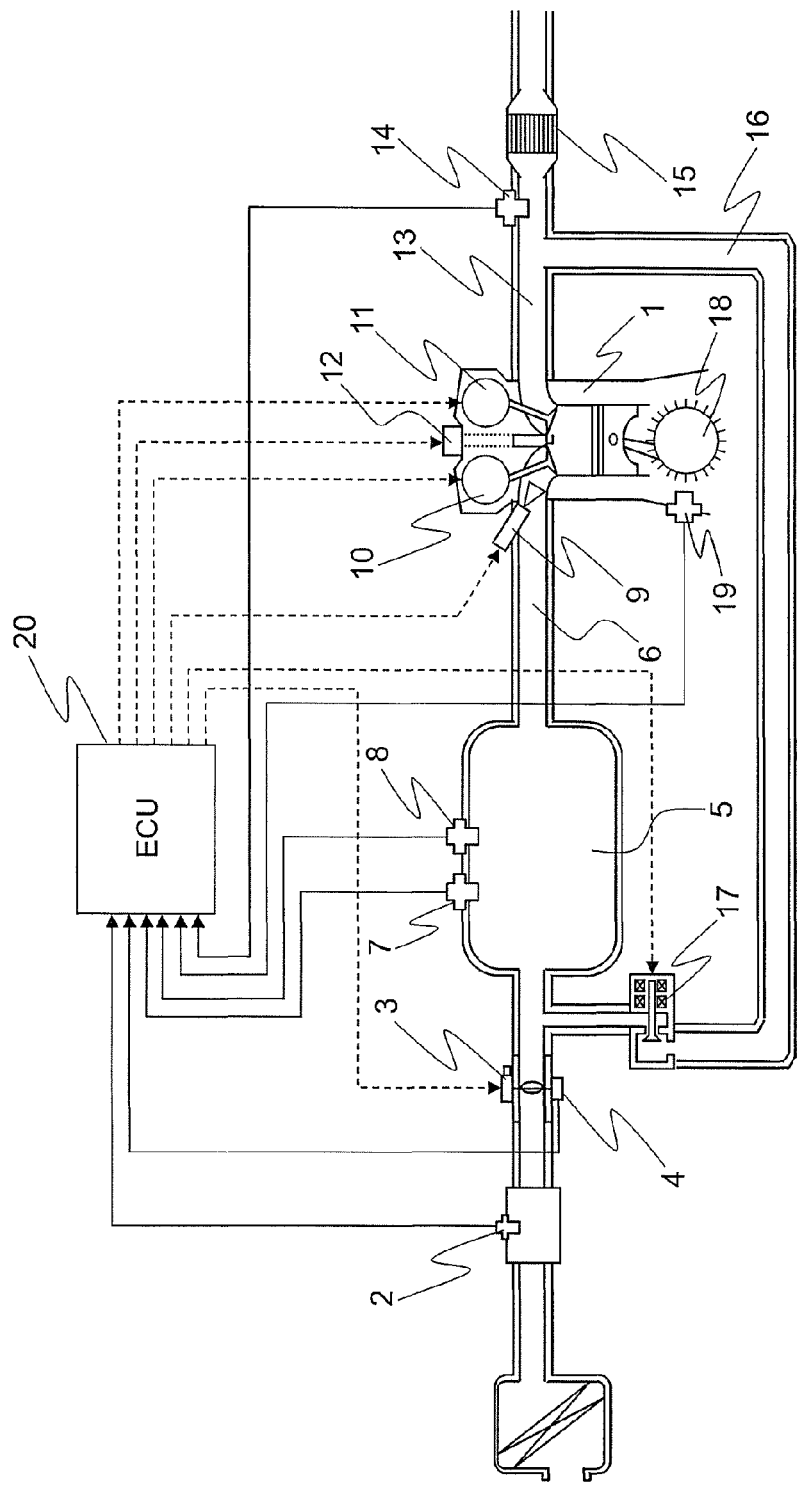
FIG. 1 is a configuration diagram illustrating an engine to which a control apparatus for an internal combustion engine according to a first embodiment of the present invention is applied.

A description is now given of a control apparatus and a control method for an internal combustion engine according to exemplary embodiments of the present invention referring to the accompanying drawings, and throughout the drawings, like or corresponding components are denoted by like reference numerals to describe those components.

First Embodiment

FIG. 1 is a configuration diagram illustrating an engine to which a control apparatus for an internal combustion engine according to a first embodiment of the present invention is applied. In FIG. 1, an AFS 2 for measuring an AFS intake air amount is mounted on an upstream side of an intake pipe of an engine 1.

An electronically-controlled throttle 3 electrically controlled for adjusting the AFS intake air amount is mounted to the intake pipe on a downstream side of the AFS 2. Moreover, a throttle opening degree sensor 4 for measuring a throttle opening degree of the electronically-controlled throttle 3 is mounted to the electronically-controlled throttle 3.

Further, on a surge tank 5 mounted to the intake pipe on a downstream side of the electronically-controlled throttle 3, an intake manifold pressure sensor 7 for measuring a pressure in a space including the surge tank 5 and an intake manifold 6 (namely, an intake manifold pressure) and an intake air temperature sensor 8 for measuring a temperature in the intake manifold (hereinafter referred to as "intake manifold temperature") are mounted.

Note that, in place of the intake air temperature sensor 8 provided for measuring the intake manifold temperature, a temperature sensor for measuring outside air, which is a different temperature in a strict sense, such as a temperature sensor integrated into the AFS 2 may be used to estimate the intake manifold temperature from an outside temperature. Moreover, in place of the AFS 2, the cylinder intake air amount may be calculated by means of the S/D method based on the intake manifold pressure and an engine rotational speed described later.

Moreover, an injector 9 for injecting a fuel is mounted in a neighborhood of an intake valve including the intake manifold 6 and an inside of a cylinder of the engine 1. Moreover, an intake VVT mechanism 10 and an exhaust VVT mechanism 11 for changing valve opening/closing timings are provided respectively for the intake valves and the exhaust valves.

Further, an ignition coil 12 for driving an ignition plug for generating a spark in the cylinder is mounted on a cylinder head of the engine 1. Moreover, an $O_2$ sensor 14 for measuring the air/fuel ratio of the exhaust gas and a catalyst 15 for purifying toxic substances in the exhaust gas are mounted on the exhaust manifold 13 on a downstream side of the cylinder and on an exhaust pipe (hereinafter referred to as "exhaust manifold") on a downstream side of the exhaust manifold 13. Note that, a linear A/F sensor may be mounted in place of the $O_2$ sensor 14.

Moreover, the exhaust manifold 13 and the surge tank 5 are connected to each other via an EGR passage 16. Moreover, an EGR valve 17 for controlling an EGR flow rate is mounted on the EGR passage 16. Further, a crank angle plate 18 to be rotated integrally with a crankshaft of the engine 1 and a crank angle sensor 19 for detecting an inter-edge cycle of the crank angle plate 18 in order to calculate the crank angle and the engine rotational speed are mounted on the crankshaft of the engine 1.

On this occasion, those various sensors and various actuators are each connected to an electronic control unit (ECU) 20, and the ECU 20 controls operations of the various actuators based on signals from the various sensors. Moreover, an atmospheric pressure sensor (not shown) for detecting the atmospheric pressure is integrated into the ECU 20, or is mounted at a location exposed to the atmosphere.

Moreover, the ECU 20 is mainly constructed by a microcomputer including a central processing unit (CPU) for carrying out arithmetic processing, a read only memory (ROM) for storing program data and fixed value data, and a random access memory (RAM) for storing data sequentially rewritten for update.

Figure 2:
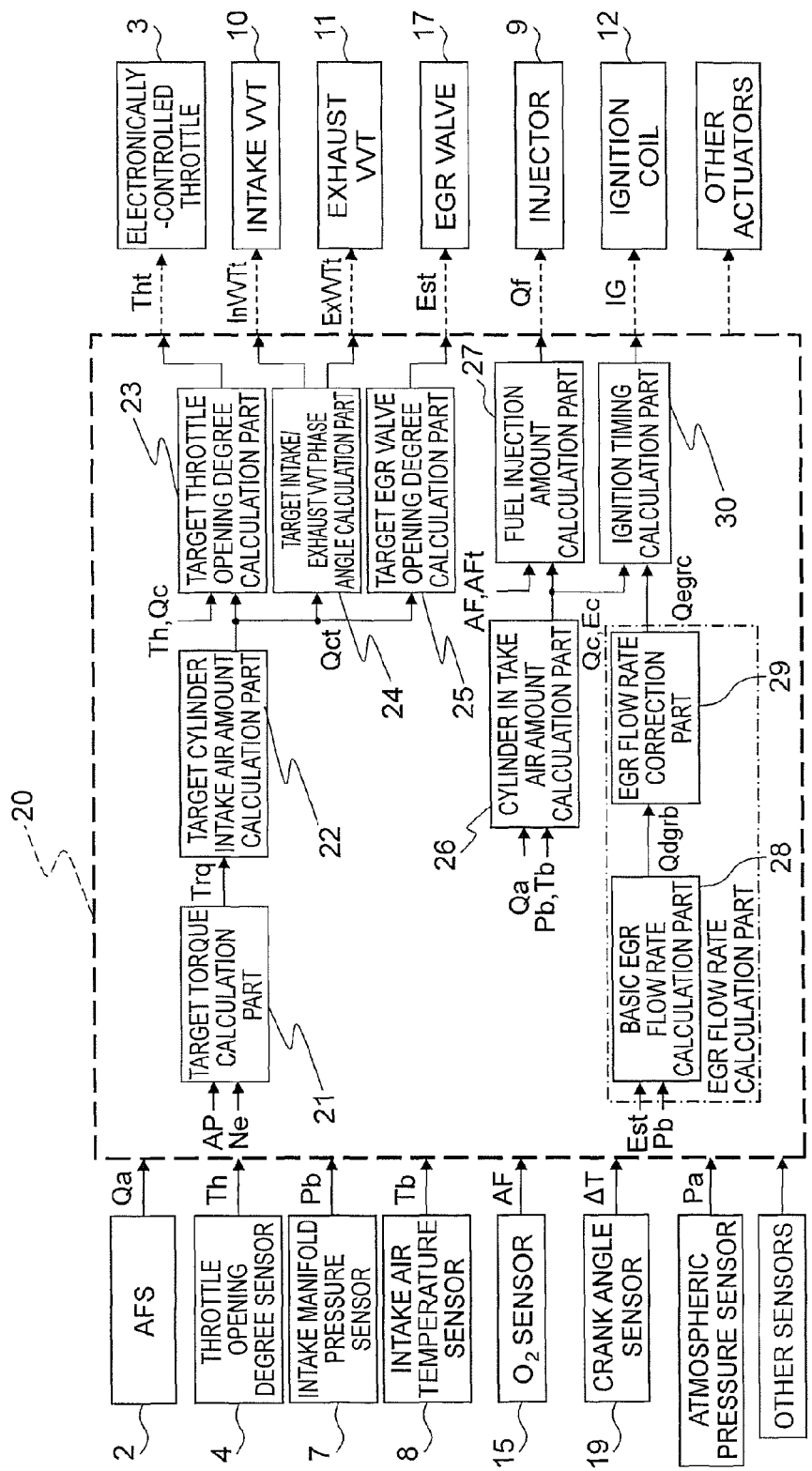
FIG. 2 is a block diagram illustrating the control apparatus for an internal combustion engine according to the first embodiment of the present invention.

FIG. 2 is a block diagram illustrating the control apparatus for an internal combustion engine according to the first embodiment of the present invention. In FIG. 2, an AFS intake air amount Qa from the AFS 2, a throttle opening degree Th from the throttle opening degree sensor 4, an intake manifold pressure Pb from the intake manifold pressure sensor 7, an intake manifold temperature Tb from the intake air temperature sensor 8, an air/fuel ratio AF from the $O_2$ sensor 14, an inter-edge cycle $\Delta T$ from the crank angle sensor 19, and an atmospheric pressure Pa from the atmospheric pressure sensor are input to the ECU 20.

From sensors other than those various sensors, such as an accelerator opening degree sensor (not shown), a vehicle speed sensor (not shown), and a knock sensor (not shown), an accelerator opening degree AP, a vehicle speed, and vibrations representing a knock generation state are respectively input to the ECU 20 as measured values. On this occasion, the various sensors and the other sensors construct an operation state detection part for detecting an operation state of the engine 1.

The ECU 20 includes a target torque calculation part 21, a target cylinder intake air amount calculation part 22, a target throttle opening degree calculation part 23, a target intake/exhaust VVT phase angle calculation part 24, a target EGR valve opening degree calculation part 25, a cylinder intake air amount calculation part 26, a fuel injection amount calculation part 27, a basic EGR flow rate calculation part 28, an EGR flow rate correction part 29, and an ignition timing calculation part 30. Note that, the basic EGR flow rate calculation part 28 and the EGR flow rate correction part 29 are collectively referred to as "EGR flow rate calculation part".

The target torque calculation part 21 calculates a target torque Trq based on the accelerator opening degree AP, an engine rotational speed Ne calculated from the inter-edge cycle $\Delta T$, and the like. The target cylinder intake air amount calculation part 22 calculates a target cylinder intake air amount Qct so as to achieve the calculated target torque Trq. The target throttle opening degree calculation part 23 calculates a target throttle opening degree Tht so as to achieve the calculated target cylinder intake air amount Qct.

On this occasion, in the target throttle opening degree calculation part 23, feedback correction control is carried out so that the throttle opening degree Th reaches the target throttle opening degree Tht. Note that, simultaneously, in the target throttle opening degree calculation part 23, feedback correction control may be applied to the target throttle opening degree Tht so that a cylinder intake air amount Qc to be described later approaches the target cylinder intake air amount Qct.

The target intake/exhaust VVT phase angle calculation part 24 calculates a target intake VVT phase angle InVVTt and a target exhaust VVT phase angle ExVVTt that provide excellent fuel consumption and exhaust gas performance under an operation condition in which the target cylinder intake air amount Qct is achieved. The target EGR valve opening degree calculation part 25 calculates a target EGR valve opening degree Est that provides excellent fuel consumption and exhaust gas performance under the operation condition in which the target cylinder intake air amount Qct is achieved.

Moreover, the ECU 20 controls the opening degree of the electronically-controlled throttle 3, the phase angles of the intake VVT mechanism 10 and the exhaust VVT mechanism 11, and the opening degree of the EGR valve 17 so that the target throttle opening degree Tht, the target intake VVT phase angle InVVTt, the target exhaust VVT phase angle ExVVTt, and the target EGR valve opening degree Est calculated as described above are achieved.

The cylinder intake air amount calculation part 26 calculates the cylinder intake air amount Qc and a charging efficiency Ec based on the AFS intake air amount Qa and the response lag on the throttle downstream side for the AFS method and based on the intake manifold pressure Pb and the intake manifold temperature Tb for the S/D method. On this occasion, the cylinder intake air amount calculation part 26 may use both the AFS method and the S/D method.

On this occasion, the AFS intake air amount Qa and the intake manifold pressure Pb vary at a predetermined crank angle cycle due to influence of an intake air pulsation caused by an operation of the intake valve and the like. Therefore, the influence of the intake air pulsation is reduced by carrying out A/D conversion for every millisecond shorter than this cycle, and averaging the converted values over each predetermined crank angle cycle, for example, over each 180 degCA for a four-cylinder engine or over each 240 degCA for a three-cylinder engine.

The fuel injection amount calculation part 27 calculates a fuel injection amount Qf based on the cylinder intake air amount Qc or the charging efficiency Ec and a target air/fuel ratio AFt arbitrarily defined in advance. On this occasion, simultaneously, in the fuel injection amount calculation part 27, feedback correction control may be applied to the fuel injection amount Qf so that the air/fuel ratio AF approaches the target air/fuel ratio Aft.

The basic EGR flow rate calculation part 28 calculates a basic EGR flow rate Qegrb based on the target EGR valve opening degree Est, the intake manifold pressure Pb, and the like. The EGR flow rate correction part 29 corrects the basic EGR flow rate Qegrb to calculate a corrected EGR flow rate Qegrc. The ignition timing calculation part 30 calculates an ignition timing IG based on the corrected EGR flow rate Qegrc, the cylinder intake air amount Qc or the charging efficiency Ec, and other operation conditions.

Moreover, the ECU 20 controls an injection amount of the injector 9 and a current supply timing of the ignition coil 12 so that the fuel injection amount Qf and the ignition timing IG calculated as described above are achieved. Note that, the ECU 20 also controls actuators other than the various actuators depending on necessity.

Referring to FIGS. 3 to 9, a detailed description is now given of processing by the basic EGR flow rate calculation part 28 and the EGR flow rate correction part 29 of the control apparatus for an internal combustion engine according to the first embodiment of the present invention. First, referring to a flowchart of FIG. 3, a description is given of specific processing by the basic EGR flow rate calculation part 28.

Figure 3:
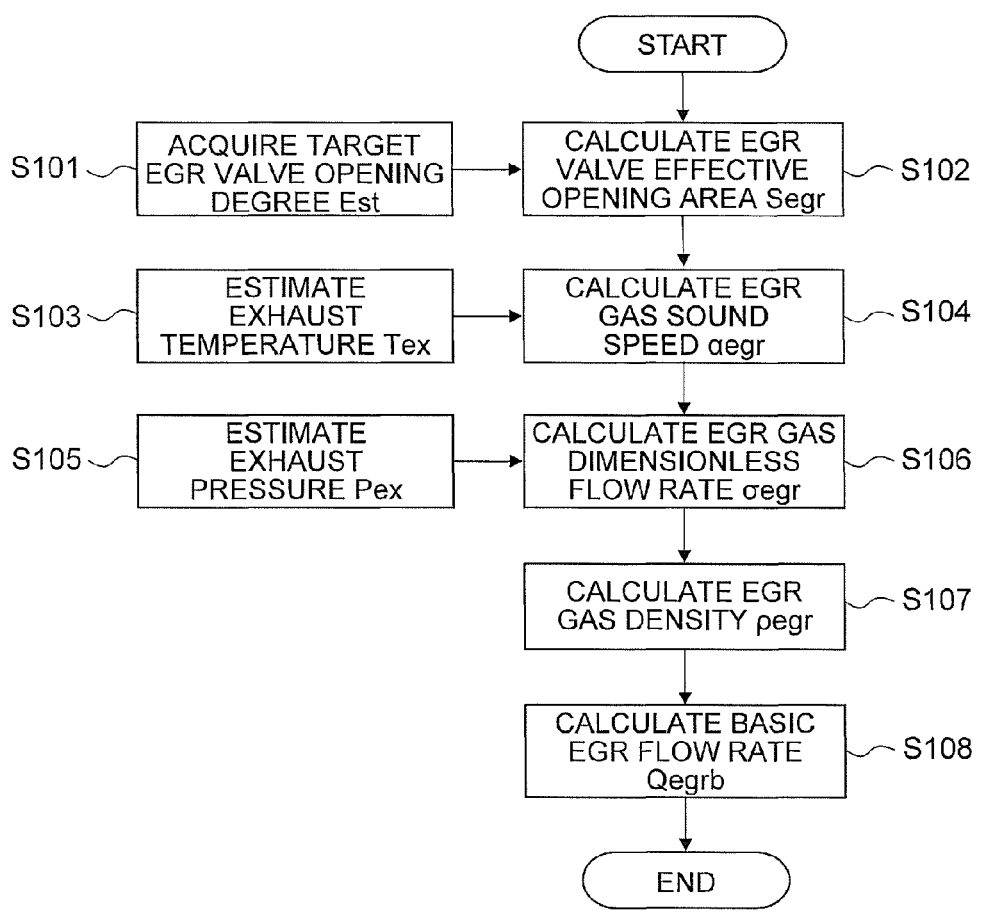
FIG. 3 is a flowchart illustrating processing by a basic EGR flow rate calculation part of the control apparatus for an internal combustion engine according to the first embodiment of the present invention.

FIG. 3 is a flowchart illustrating the processing by the basic EGR flow rate calculation part (processing part) of the control apparatus for an internal combustion engine according to the first embodiment of the present invention. This processing is carried out as interrupt processing at each predetermined crank angle cycle (such as at each BTDC75 degCA) or as main processing at each predetermined time cycle (such as at each 10 milliseconds). Moreover, the basic EGR flow rate calculation part 28 calculates the basic EGR flow rate Qegrb by a method of using Expressions (1) to (4) to calculate the EGR flow rate.

In FIG. 3, first, the basic EGR flow rate calculation part 28 acquires the target EGR valve opening degree Est as the EGR valve opening degree (Step S101). Note that, if an EGR valve opening degree sensor for detecting the EGR valve opening degree is independently mounted, the EGR valve opening degree may be acquired based on an output value of the EGR valve opening degree sensor.

Then, the basic EGR flow rate calculation part 28 calculates an effective opening area Segr of the EGR valve based on the target EGR valve opening degree Est (Step S102). On this occasion, the basic EGR flow rate calculation part 28 stores a relationship between the target EGR valve opening degree Est and the EGR valve effective opening area Segr, which are measured, for example, in an operation region having a small influence of ripples to be described later, as a map in advance, and calculates the EGR valve effective opening area Segr corresponding to the target EGR valve opening degree Est.

Then, the basic EGR flow rate calculation part 28 calculates an exhaust temperature Tex (Step S103). On this occasion, for example, attention is paid to a strong correlation among the exhaust temperature Tex, the engine rotational speed Ne, and the charging efficiency Ec. The basic EGR flow rate calculation part 28 stores in advance an actually measured relationship thereamong as a map having the engine rotational speed Ne and the charging efficiency Ec as its axes, and calculates the exhaust temperature Tex based on the operation condition. Note that, filtering may be applied to the exhaust temperature Tex depending on necessity.

Then, the basic EGR flow rate calculation part 28 calculates a sound speed $\alpha egr$ of the EGR gas based on the exhaust temperature Tex (Step S104). On this occasion, the basic EGR flow rate calculation part 28 can calculate the sound speed $\alpha egr$ of the EGR gas by using Expression (2). Note that, the calculation of Expression (2) requires calculation of the square root, and hence the basic EGR flow rate calculation part 28 may store theoretical calculation results of the exhaust temperature Tex and the sound speed $\alpha egr$ of the EGR gas as a map in advance, and may calculate the sound speed $\alpha egr$ of the EGR gas corresponding to the exhaust temperature Tex.

Then, the basic EGR flow rate calculation part 28 calculates an exhaust pressure Pex (Step S105). On this occasion, for example, attention is paid to a strong correlation among the exhaust pressure Pex, an exhaust flow rate Qex, which is a sum of the cylinder intake air amount Qc and the fuel injection amount Qf, and an exhaust pressure ratio Pex/Pa, which is a ratio between the exhaust pressure Pex and the atmospheric pressure Pa. The basic EGR flow rate calculation part 28 stores in advance an actually measured relationship thereamong as a map having the exhaust flow rate Qex as its axis, and calculates the exhaust pressure Pex based on the operation condition and the atmospheric pressure Pa.

On this occasion, the exhaust pressure Pex shows a large fluctuation as described later, and hence a value averaged over each predetermined crank angle cycle or each predetermined time cycle is used as the exhaust pressure Pex. Note that, filtering may be applied to the exhaust pressure Pex depending on necessity.

Then, the basic EGR flow rate calculation part 28 calculates a dimensionless flow rate $\sigma egr$ of the EGR gas based on the exhaust pressure Pex (Step S106). On this occasion, the basic EGR flow rate calculation part 28 can calculate the dimensionless flow rate $\sigma egr$ of the EGR gas by using Expression (3).

Note that, the calculation of Expression (3) is complicated, and there is a fear of an increase in a processing amount of the ECU 20. Therefore, the basic EGR flow rate calculation part 28 may store theoretical calculation results of an intake manifold pressure ratio Pb/Pex, which is a ratio between the intake manifold pressure Pb and the exhaust pressure Pex, and the dimensionless flow rate $\sigma egr$ of the EGR gas as a map in advance, and may calculate the dimensionless flow rate $\sigma egr$ of the EGR gas corresponding to the intake manifold pressure ratio Pb/Pex. On this occasion, a value averaged over each predetermined crank angle cycle described above is used as the intake manifold pressure Pb.

Next, the basic EGR flow rate calculation part 28 calculates a density $\rho egr$ of the EGR gas (Step S107). On this occasion, the basic EGR flow rate calculation part 28 can calculate the density $\rho egr$ of the EGR gas by using Expression (4).

Then, the basic EGR flow rate calculation part 28 calculates the basic EGR flow rate Qegrb (Step S108). Note that, the basic EGR flow rate calculation part 28 calculates the basic EGR flow rate Qegrb by using Expression (1), but the basic EGR flow rate is corrected by the EGR flow rate correction part 29 to be described later, and is thus denoted by the basic EGR flow rate Qegrb suffixed by b. As described above, the basic EGR flow rate Qegrb is calculated by the basic EGR flow rate calculation part 28 based on Expressions (1) to (4).

Referring to FIGS. 4 to 8, a description is now given of an idea of the correction by the EGR flow rate correction part 29. It is known that pressure fluctuations are generated in the intake pipe (on this occasion, the intake manifold from the downstream side of the electronically-controlled throttle 3 to the intake valve) and the exhaust pipe (on this occasion, the exhaust manifold from the exhaust valve to the catalyst 15) of the internal combustion engine in response to the operations of the intake valve and the exhaust valve.

First, in the intake manifold, when the throttle opening degree of the electronically-controlled throttle 3 is constant, the air flows into the intake pipe at a certain flow rate, and the intake manifold pressure Pb increases. However, when the intake valve opens in the intake stroke so that the cylinder sucks the air in the intake manifold, the air in the intake manifold decreases accordingly, and the intake manifold pressure Pb decreases.

In other words, the intake manifold pressure Pb decreases at a timing when the lift amount of the intake valve increases in the intake stroke of any of the cylinders, and increases at other timings, and the increase and the decrease are repeated while the internal combustion engine is in operation. Therefore, the intake manifold pressure Pb fluctuates over each predetermined crank angle cycle, for example, each 180 degCA for a four-cylinder engine or each 240 degCA for a three-cylinder engine in synchronization with the rotation of the engine. This phenomenon is hereinafter referred to as "ripple of intake manifold pressure".

Note that, a reason why the intake manifold pressure Pb is averaged over each predetermined crank angle cycle before use as described above is to suppress the fluctuation of the intake manifold pressure Pb at the timing of the A/D conversion caused by the influence of the ripple of the intake manifold pressure, for example, during a steady operation.

Moreover, also in the exhaust manifold, when the exhaust valve opens in the expansion stroke or the exhaust stroke, the exhaust gas at high temperature and high pressure in the cylinder flows out to the exhaust manifold, and the exhaust pressure Pex in the exhaust manifold increases. However, the exhaust gas subsequently flows out from the exhaust manifold to the atmosphere via the catalyst 15 and a muffler, and the exhaust pressure Pex decreases.

In other words, the exhaust pressure Pex increases at a timing when the exhaust valve opens, and decreases at other timings because the exhaust gas flows out to the atmosphere, and the increase and the decrease are repeated while the internal combustion engine is in operation. Therefore, similarly to the intake manifold pressure Pb, the exhaust pressure Pex fluctuates over each predetermined crank angle cycle in synchronization with the rotation of the engine. This phenomenon is hereinafter referred to as "ripple of exhaust pressure".

A description is now given of a relationship between a true EGR flow rate Qegr and the basic EGR flow rate Qegrb calculated by the basic EGR flow rate calculation part 28 at the time when the intake manifold pressure Pb and the exhaust pressure Pex each periodically fluctuate as described above.

On this occasion, the true EGR flow rate Qegr is an average of the EGR flow rate calculated by using the intake manifold pressure Pb and the exhaust pressure Pex measured in real time, but can be calculated as an actually measured value based on an EGR rate calculated from $CO_2$ densities in the intake manifold and the exhaust manifold and the cylinder intake air amount Qc. Moreover, the basic EGR flow rate Qegrb is the EGR flow rate calculated by using the intake manifold pressure Pb and the exhaust pressure Pex averaged over each predetermined crank angle cycle.

In a naturally-aspirated engine, in general, the intake manifold pressure Pb is lower than the atmospheric pressure Pa, and the exhaust pressure Pex is higher than the atmospheric pressure Pa, and hence it is considered that the relationship Pb≤Pa≤Pex is generally satisfied. In this case, the dimensionless flow rate σegr of the EGR gas can be calculated by using Expression (3).

However, when the intake manifold pressure Pb and the exhaust pressure Pex each periodically fluctuate, the relationship Pex<Pb may momentarily be satisfied. Note that, in this case, when the dimensionless flow rate σegr of the EGR gas is calculated by using Expression (3), the dimensionless flow rate σegr becomes an imaginary number, but, as a physical phenomenon, it is considered that a counter flow of EGR gas from the intake manifold to the exhaust manifold is present. Thus, the dimensionless flow rate σegr of the EGR gas at the time when Pex<Pb is established can be represented as Expression (5). Note that, minus in Expression (5) represents a counter flow.

$$\sigma_{egr} = -\sqrt{\frac{2}{\kappa_{egr}-1}\left[\left(\frac{P_{ex}}{P_b}\right)^{\frac{2}{\kappa_{egr}}} - \left(\frac{P_{ex}}{P_b}\right)^{\frac{\kappa_{egr}+1}{\kappa_{egr}}}\right]} \quad (5)$$

$$= -\sqrt{\frac{2}{\kappa_{egr}-1}\left[\left(\frac{1}{P_b/P_{ex}}\right)^{\frac{2}{\kappa_{egr}}} - \left(\frac{1}{P_b/P_{ex}}\right)^{\frac{\kappa_{egr}+1}{\kappa_{egr}}}\right]}$$

$$\left(\because P_b > P_{ex}, \frac{1}{(P_b/P_{ex})_{choke}} = \left(\frac{2}{\kappa_{egr}+1}\right)^{\frac{\kappa_{egr}}{\kappa_{egr}-1}}\right)$$

In Expression (5), when Pb/Pex is more than (Pb/Pex) choke, the state is in the choke area, and the dimensionless flow rate σegr of the EGR gas on this occasion is the same value as σegr@choke for (Pb/Pex)choke.

Figure 4:
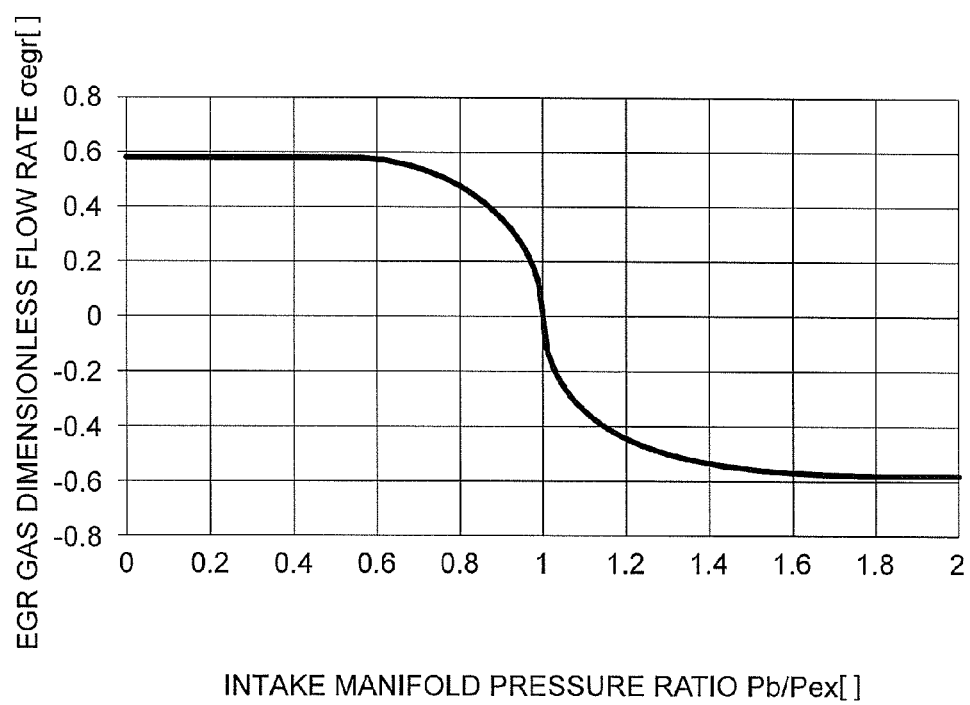
FIG. 4 is a graph showing a relationship between an intake manifold pressure ratio and a dimensionless flow rate of EGR gas in the control apparatus for an internal combustion engine according to the first embodiment of the present invention.

On this occasion, FIG. 4 shows a relationship between the intake manifold pressure ratio Pb/Pex and the dimensionless flow rate σegr of the EGR gas calculated by using Expressions (3) and (5). FIG. 4 is a graph showing the relationship between the intake manifold pressure ratio and the dimensionless flow rate of the EGR gas in the control apparatus for an internal combustion engine according to the first embodiment of the present invention. The EGR flow rate in an area where a counter flow is momentarily generated can be calculated by using the dimensionless flow rate σegr of the EGR gas shown in FIG. 4.

Figure 5:
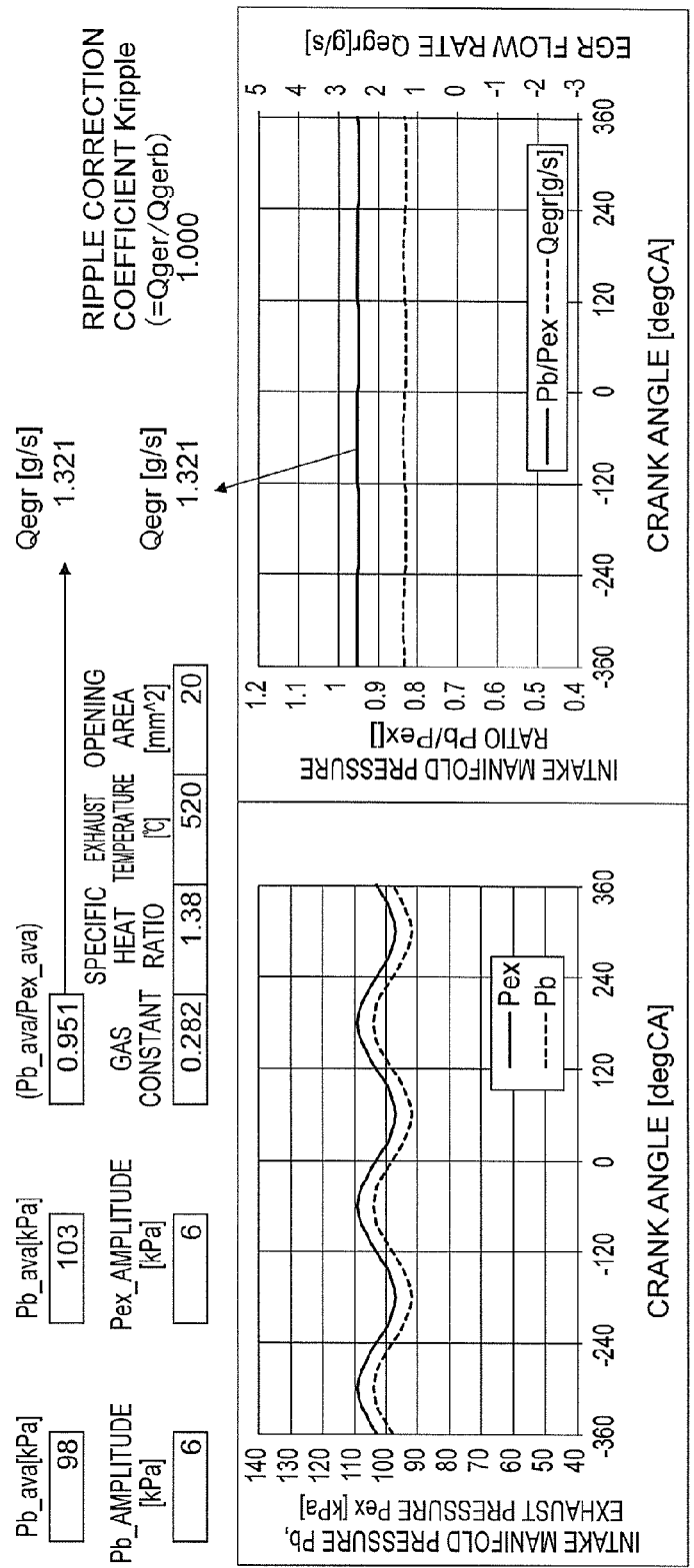
FIG. 5 is an explanatory diagram illustrating influence of a ripple of an intake manifold pressure and a ripple of an exhaust pressure on an EGR flow rate in the control apparatus for an internal combustion engine according to the first embodiment of the present invention.
Figure 6:
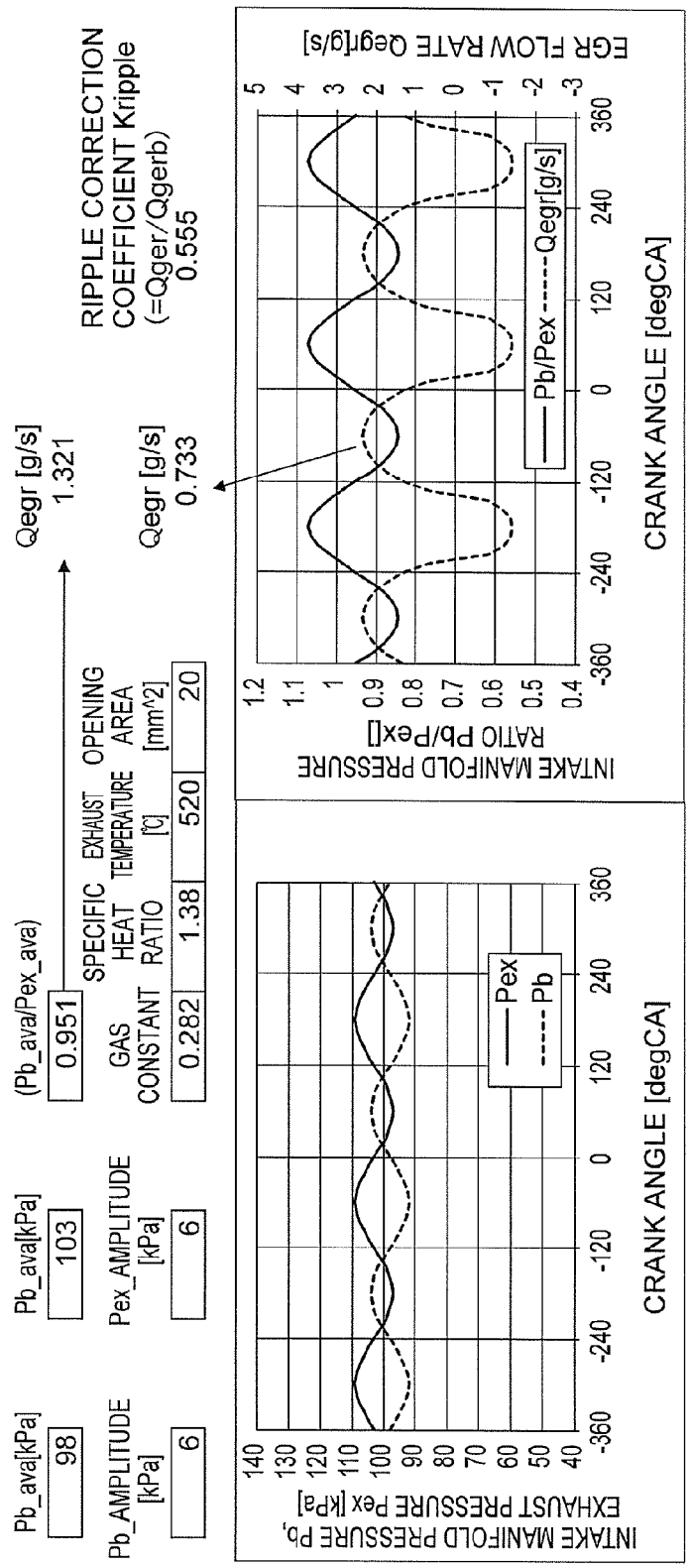
FIG. 6 is an explanatory diagram illustrating the influence of the ripple of the intake manifold pressure and the ripple of the exhaust pressure on the EGR flow rate in the control apparatus for an internal combustion engine according to the first embodiment of the present invention.
Figure 7:
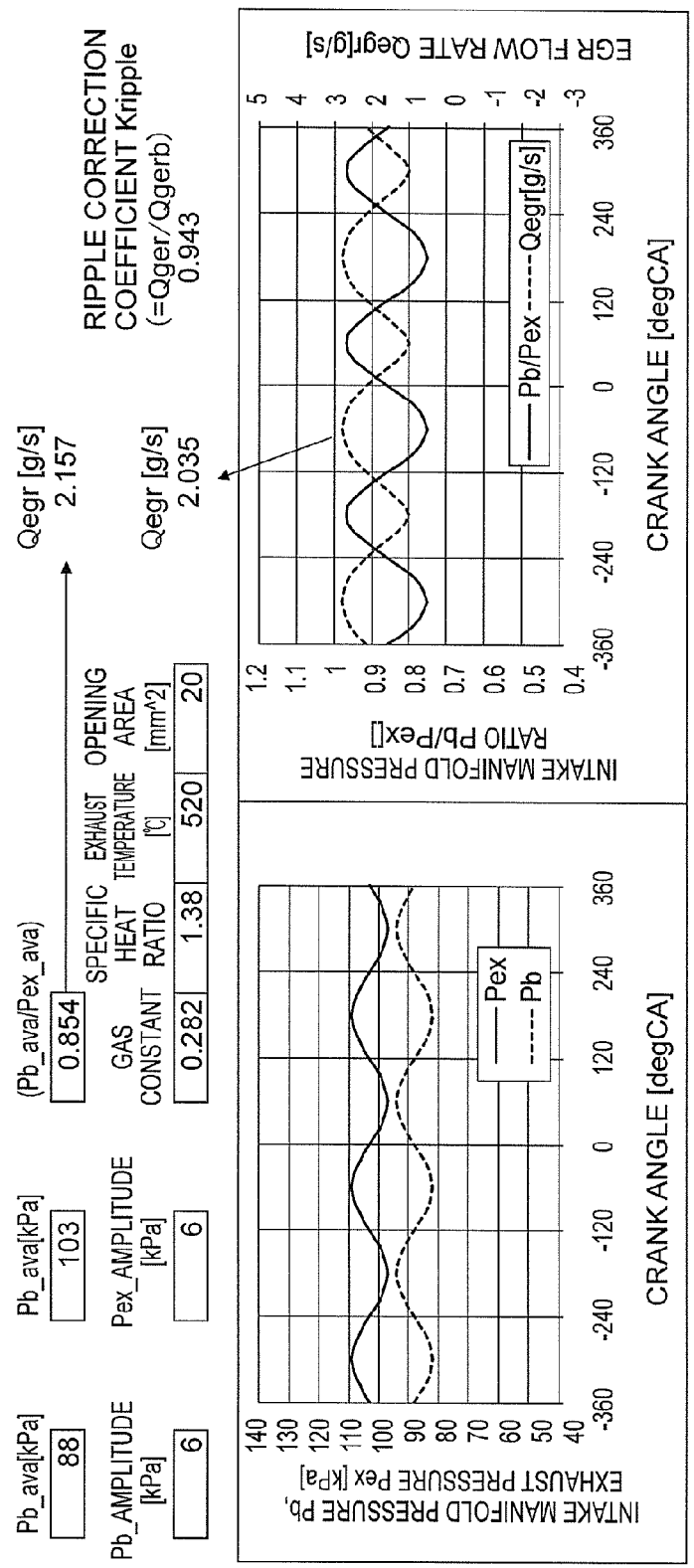
FIG. 7 is an explanatory diagram illustrating the influence of the ripple of the intake manifold pressure and the ripple of the exhaust pressure on the EGR flow rate in the control apparatus for an internal combustion engine according to the first embodiment of the present invention.

Moreover, FIGS. 5 to 7 show a relationship between the true EGR flow rate Qegr calculated by using the relationship between the intake manifold pressure ratio Pb/Pex and the dimensionless flow rate σegr of the EGR gas shown in FIG. 4 and the basic EGR flow rate Qegrb. Note that, the examples in FIGS. 5 to 7 are results of a simple simulation assuming a three-cylinder engine, in which the ripple of the intake manifold pressure and the ripple of the exhaust pressure are simulated as sinusoidal curves.

FIG. 5 is an explanatory diagram illustrating influence of the ripple of the intake manifold pressure and the ripple of the exhaust pressure on the EGR flow rate in the control apparatus for an internal combustion engine according to the first embodiment of the present invention. FIG. 5 illustrates the case where ripples in the same phase are superimposed both on the intake manifold pressure Pb and the exhaust pressure Pex, and the intake manifold pressure ratio Pb/Pex is close to 1.0 while the ripple of the intake manifold pressure ratio Pb/Pex is small.

In FIG. 5, both the intake manifold pressure Pb and the exhaust pressure Pex greatly fluctuate, but are in the same phase, and hence the counter flow of the EGR gas is not present. The fluctuations in the calculated intake manifold pressure ratio Pb/Pex and true EGR flow rate Qegr are small.

In other words, in the case of FIG. 5, the true EGR flow rate Qegr and the basic EGR flow rate Qegrb approximately match each other, and a ripple correction coefficient Kripple (=Qegr/Qegrb), which is an index representing an error between the true EGR flow rate Qegr and the basic EGR flow rate Qegrb caused by the influence of the ripple of the intake manifold pressure and the ripple of the exhaust pressure, is approximately 1.0.

FIG. 6 is an explanatory diagram illustrating the influence of the ripple of the intake manifold pressure and the ripple of the exhaust pressure on the EGR flow rate in the control apparatus for an internal combustion engine according to the first embodiment of the present invention. FIG. 6 illustrates the case where ripples in the opposite phases are superimposed both on the intake manifold pressure Pb and the exhaust pressure Pex, and the intake manifold pressure ratio Pb/Pex is close to 1.0 while the ripple of the intake manifold pressure ratio Pb/Pex is large.

In FIG. 6, the amplitudes of the intake manifold pressure Pb and the exhaust pressure Pex have the same values as those of FIG. 5, but because the phases are opposite to each other, the counter flow of the EGR gas is temporarily present. On this occasion, both the calculated intake manifold pressure ratio Pb/Pex and true EGR flow rate Qegr have large fluctuation amounts, and a large error is generated between the true EGR flow rate Qegr and the basic EGR flow rate Qegrb.

Moreover, the ripple correction coefficient Kripple is approximately 0.55, and hence the basic EGR flow rate Qegrb calculated by the basic EGR flow rate calculation part 28 has a value close to twice of the true EGR flow rate Qegr, resulting in a large error. Note that, the basic EGR flow rate Qegrb is the same value as that of FIG. 5.

FIG. 7 is an explanatory diagram illustrating the influence of the ripple of the intake manifold pressure and the ripple of the exhaust pressure on the EGR flow rate in the control apparatus for an internal combustion engine according to the first embodiment of the present invention. FIG. 7 illustrates the case where ripples in the opposite phases are superimposed both on the intake manifold pressure Pb and the exhaust pressure Pex, and the intake manifold pressure ratio Pb/Pex is smaller than 1.0 while the ripple of the intake manifold pressure ratio Pb/Pex is large.

In FIG. 7, the amplitudes and the phases of the intake manifold pressure Pb and the exhaust pressure Pex have the same values as those of FIG. 6, but because the intake manifold pressure Pb is low, the counter flow of the EGR gas is not present. On this occasion, both the calculated intake manifold pressure ratio Pb/Pex and true EGR flow rate Qegr have large fluctuation amounts, but the error between the true EGR flow rate Qegr and the basic EGR flow rate Qegrb is smaller than the value of FIG. 6, and the ripple correction coefficient Kripple is approximately 0.94, which is sufficiently close to 1.0 compared with the value of FIG. 6.

In this way, when the counter flow as illustrated in FIG. 6 is present, a large error is generated between the basic EGR flow rate Qegrb calculated by the basic EGR flow rate calculation part 28 and the true EGR flow rate Qegr. The reason for this is considered that the intake manifold pressure ratio Pb/Pex illustrated in FIG. 4 has strong nonlinearity in a neighborhood of 1.0. In other words, this phenomenon is considered to be a problem specific to the EGR passage 16 connecting between the exhaust pipe and the intake pipe of the engine 1.

Referring to FIGS. 5 to 7, a description has been given of the influence on the error between the true EGR flow rate Qegr and the basic EGR flow rate Qegrb exerted by the ripple of the intake manifold pressure and the ripple of the exhaust pressure, and the use of the ripple correction coefficient Kripple as the index representing the degree of this influence. On this occasion, as elements exerting influence on the magnitudes (namely, the amplitudes) of the ripples, the engine rotational speed Ne, the intake manifold pressure Pb, and the exhaust pressure Pex are conceivable.

Moreover, as elements exerting influence on the phases of the ripples, the intake VVT phase angle and the exhaust VVT phase angle are conceivable. For the phase of the ripple of the intake manifold pressure, a piston position in the intake stroke is more dominant than the intake VVT phase angle. It is experimentally confirmed that the exhaust VVT phase angle has particularly a great influence on the phases of the ripples.

Note that, it is considered that, in a case in which the intake valve is closed until a middle of the intake stroke or the like, the influence of the intake VVT phase angle is also increased. Moreover, the influence of the ripple of the intake manifold pressure and the ripple of the exhaust pressure on the ripple correction coefficient Kripple changes depending also on the intake manifold pressure ratio Pb/Pex.

Therefore, in order to calculate the true EGR flow rate Qegr from the basic EGR flow rate Qegrb calculated by the basic EGR flow rate calculation part 28, an appropriate ripple correction coefficient Kripple only needs to be calculated depending on elements exerting influence on the magnitudes (namely, the amplitudes) and the phases of the ripples, and the basic EGR flow rate Qegrb only needs to be corrected by using Expression (6).

$$Q_{egr} = K_{ripple} \cdot Q_{egrb} \tag{6}$$

In Expression (6), the ripple correction coefficient Kripple is calculated based on the engine rotational speed Ne, the intake manifold pressure ratio Pb/Pex, and the exhaust VVT phase angle. This is because the inventor(s) of the present invention investigated the relationship between the ripple correction coefficient Kripple, and the engine rotational speed Ne, the intake manifold pressure ratio Pb/Pex, and the exhaust VVT phase angle ExVVT to find out that the ripple correction coefficient Kripple can be precisely calculated by simple calculation as a result of approximation by a relational equation represented by Expression (7).

$$K_{ripple} = \min\left\{ K_1\left(\frac{P_b}{P_{ex}}\right) + K_2(Ne, ExVVT), 1.0 \right\} \tag{7}$$

Figure 8:
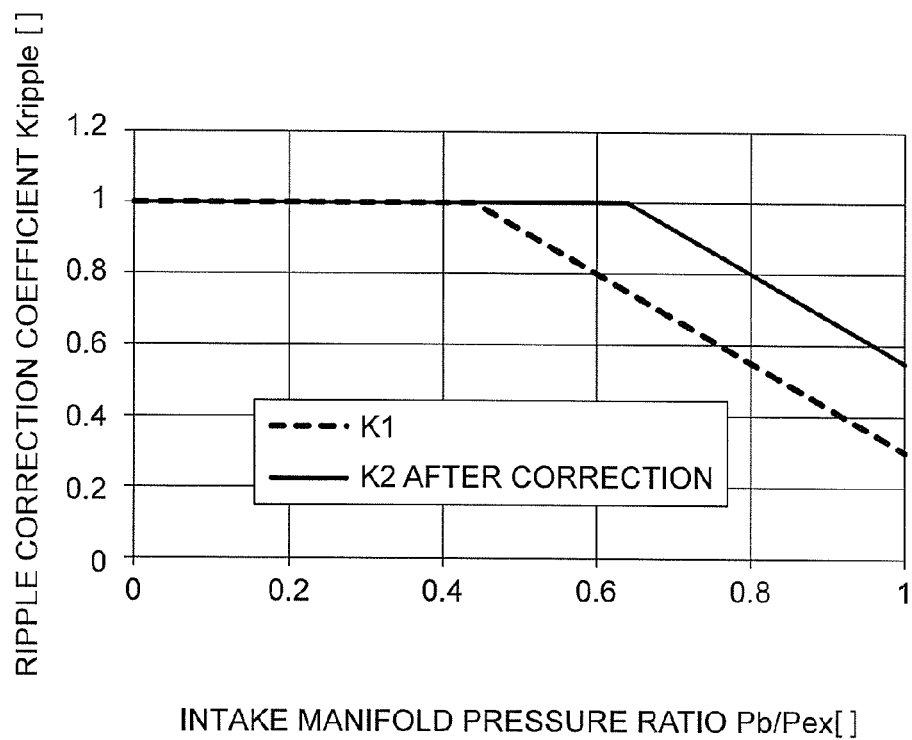
FIG. 8 is a graph showing a relationship between the intake manifold pressure ratio and a ripple correction coefficient in the control apparatus for an internal combustion engine according to the first embodiment of the present invention.

On this occasion, FIG. 8 shows a relationship between the intake manifold pressure ratio Pb/Pex and the ripple correction coefficient Kripple calculated by using Expression (7). FIG. 8 is a graph showing the relationship between the intake manifold pressure ratio and the ripple correction coefficient in the control apparatus for an internal combustion engine according to the first embodiment of the present invention.

In FIG. 8, for the entire operation area of the engine rotational speed Ne, the intake manifold pressure ratio Pb/Pex, and the exhaust VVT phase angle ExVVT, the smallest ripple correction coefficient Kripple calculated from an actually measured value of the intake manifold pressure ratio Pb/Pex is stored as a map as a first ripple correction coefficient K1 relating to the intake manifold pressure ratio Pb/Pex.

Moreover, if a difference between the ripple correction coefficient Kripple calculated from the actually measured values of the engine rotational speed Ne and the exhaust VVT phase angle ExVVT and the first ripple correction coefficient K1 is stored as a map as a second ripple correction coefficient K2 relating to the engine rotational speed Ne and the exhaust VVT phase angle ExVVT, the ripple correction coefficient Kripple can be precisely calculated based on Expression (7).

Figure 9:
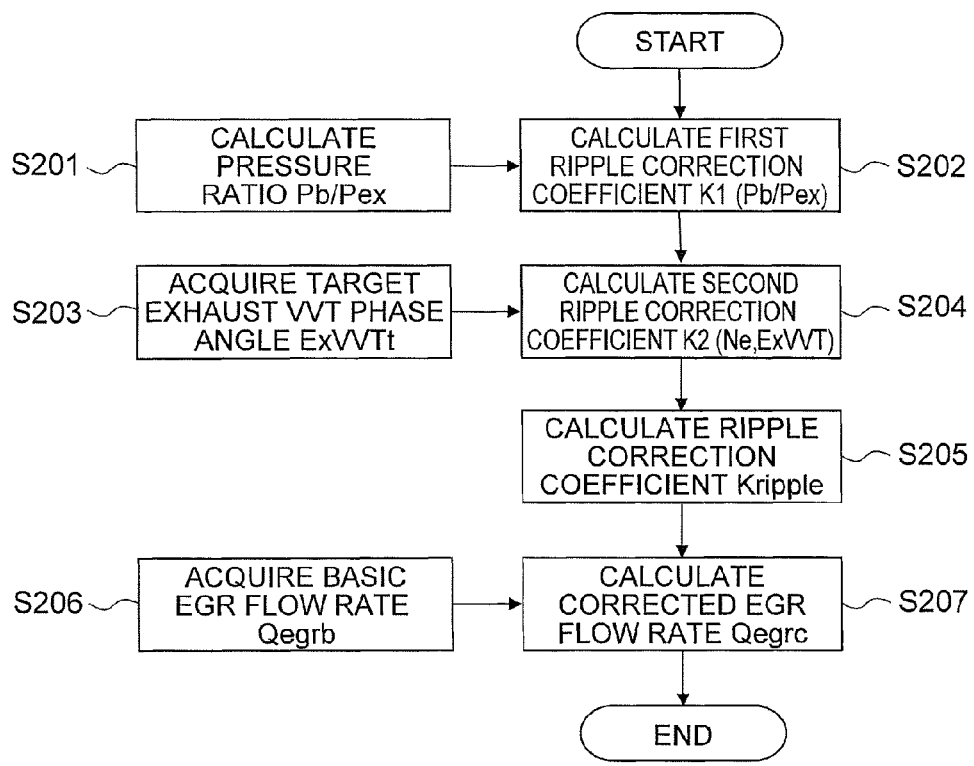
FIG. 9 is a flowchart illustrating processing by an EGR flow rate correction part of the control apparatus for an internal combustion engine according to the first embodiment of the present invention.

Referring to a flowchart of FIG. 9, a description is now given of specific processing by the EGR flow rate correction part 29. FIG. 9 is a flowchart illustrating the processing by the EGR flow rate correction part (processing part) of the control apparatus for an internal combustion engine according to the first embodiment of the present invention. This processing is carried out as interrupt processing at each predetermined crank angle cycle (such as at each BTDC75 degCA) or as main processing at each predetermined time cycle (such as at each 10 milliseconds).

In FIG. 9, first, the EGR flow rate correction part 29 calculates the intake manifold pressure ratio Pb/Pex (Step S201). On this occasion, the EGR flow rate correction part 29 calculates the intake manifold pressure ratio Pb/Pex based on the intake manifold pressure Pb averaged over each predetermined crank angle cycle and the exhaust pressure Pex calculated in Step S105 of FIG. 3.

Then, the EGR flow rate correction part 29 calculates the first ripple correction coefficient K1 based on the intake manifold pressure ratio Pb/Pex (Step S202). On this occasion, the EGR flow rate correction part 29 stores a relationship between the intake manifold pressure ratio Pb/Pex and the first ripple correction coefficient K1 as a map in advance, and calculates the first ripple correction coefficient K1 corresponding to the intake manifold pressure ratio Pb/Pex.

Then, the EGR flow rate correction part 29 acquires the target exhaust VVT phase angle ExVVTt as the exhaust VVT phase angle ExVVT (Step S203). Note that, the EGR flow rate correction part 29 may use a cam angle plate (not shown) mounted to an exhaust cam (not shown) and a cam angle sensor (not shown) to acquire the exhaust VVT phase angle ExVVT from the phase difference from the crank angle.

Then, the EGR flow rate correction part 29 calculates the second ripple correction coefficient K2 based on the engine rotational speed Ne and the target exhaust VVT phase angle ExVVTt (Step S204). On this occasion, the EGR flow rate correction part 29 stores a relationship between the engine rotational speed Ne and the target exhaust VVT phase angle ExVVTt, and the second ripple correction coefficient K2 as a map in advance, and calculates the second ripple correction coefficient K2 corresponding to the engine rotational speed Ne and the target exhaust VVT phase angle ExVVTt.

Then, the EGR flow rate correction part 29 calculates the ripple correction coefficient Kripple by using Expression (7) based on the first ripple correction coefficient K1 and the second ripple correction coefficient K2 (Step S205).

Then, the EGR flow rate correction part 29 acquires the basic EGR flow rate Qegrb calculated in Step S108 of FIG. 3 (Step S206).

Then, the EGR flow rate correction part 29 calculates the corrected EGR flow rate Qegrc by using Expression (6) based on the ripple correction coefficient Kripple and the basic EGR flow rate Qegrb. As a result, the corrected EGR flow rate Qegrc can be precisely calculated as the true EGR flow rate Qegr.

In this way, the EGR flow rate can be precisely calculated by correcting the basic EGR flow rate Qegrb, which is calculated based on a theoretical equation, based on the engine rotational speed Ne, the intake manifold pressure ratio Pb/Pex, which is the pressure ratio between the intake manifold pressure Pb and the exhaust pressure Pex, and the exhaust VVT phase angle ExVVT.

As described above, according to the first embodiment, the basic EGR flow rate calculation part calculates the basic EGR flow rate based on the intake manifold pressure, which is the pressure in the intake manifold, the exhaust pressure, which is the pressure in the exhaust pipe, the exhaust temperature, which is the temperature in the exhaust pipe, and the opening degree of the EGR valve, and the EGR flow rate correction part corrects the basic EGR flow rate based on the intake manifold pressure ratio, which is the ratio between the intake manifold pressure and the exhaust pressure, the rotational speed of the internal combustion engine, and the exhaust VVT phase angle of the exhaust VVT mechanism, to thereby calculate the corrected EGR flow rate as the EGR flow rate.

Consequently, the EGR flow rate can be precisely calculated in the engine including the intake VVT mechanism and the exhaust VVT mechanism and configured to carry out the external EGR control.

A description is given of the first embodiment by taking a naturally-aspirated engine as an example, but the engine is not limited thereto, and the EGR flow rate in a supercharged engine can be calculated in the same method. Moreover, when the influence of the intake VVT phase angle InVVT is high, for example, as represented by Expression (8), the ripple correction coefficient Kripple can be more precisely calculated by introducing a third ripple correction coefficient K3 relating to the engine rotational speed Ne and the intake VVT phase angle InVVT.

$$K_{ripple} = \min\left\{K_1\left(\frac{P_b}{P_{ex}}\right) + K_2(Ne, ExVVT) + K_3(Ne, InVVT), 1.0\right\} \quad (8)$$

What is claimed is:

1. A control apparatus for an internal combustion engine, comprising:
   a throttle mounted to an intake pipe of an internal combustion engine;
   an intake VVT mechanism and an exhaust VVT mechanism for changing valve opening/closing timings of the internal combustion engine;
   an EGR passage for connecting between an exhaust pipe of the internal combustion engine and an intake manifold mounted to the intake pipe on a downstream side of the throttle, to thereby introduce a part of exhaust gas into the intake manifold;
   an EGR valve, which is mounted on the EGR passage, for controlling an EGR flow rate flowing from the EGR passage into the intake manifold;
   an operation state detection part for detecting an operation state of the internal combustion engine; and
   an EGR flow rate calculation part for calculating the EGR flow rate,
   wherein the EGR flow rate calculation part comprises:
      a basic EGR flow rate calculation part for calculating a basic EGR flow rate based on an intake manifold pressure, which is a pressure in the intake manifold, an exhaust pressure, which is a pressure in the exhaust pipe, an exhaust temperature, which is a temperature in the exhaust pipe, and an opening degree of the EGR valve; and
      an EGR flow rate correction part for correcting the basic EGR flow rate based on an intake manifold pressure ratio, which is a ratio between the intake manifold pressure and the exhaust pressure, a rotational speed of the internal combustion engine, and an exhaust VVT phase angle of the exhaust VVT mechanism, to thereby calculate a corrected EGR flow rate as the EGR flow rate.

2. A control apparatus for an internal combustion engine according to claim 1, wherein the basic EGR flow rate calculation part is configured to:

store a relationship between the exhaust temperature, and a rotational speed of the internal combustion engine and a charging efficiency of the internal combustion engine as a map in advance, and calculate the exhaust temperature based on the rotational speed of the internal combustion engine and the charging efficiency of the internal combustion engine; and store a relationship between an exhaust flow rate, which is a sum of a cylinder intake air amount taken into a cylinder of the internal combustion engine and a fuel injection amount, and an exhaust pressure ratio, which is a pressure ratio between the exhaust pressure and an atmospheric pressure, as a map in advance, and calculate the exhaust pressure based on the exhaust flow rate and the atmospheric pressure.

3. A control apparatus for an internal combustion engine according to claim 1, wherein the basic EGR flow rate calculation part is configured to:

store a relationship between the opening degree of the EGR valve and an effective opening area of the EGR valve as a map in advance, and calculate the effective opening area of the EGR valve based on the opening degree of the EGR valve;

store a relationship between the exhaust temperature and a sound speed of an EGR gas as a map in advance, and calculate the sound speed of the EGR gas based on the exhaust temperature;

store a relationship between the intake manifold pressure ratio and a dimensionless flow rate of the EGR gas as a map in advance, and calculate the dimensionless flow rate of the EGR gas based on the intake manifold pressure ratio; and calculate the basic EGR flow rate based on an exhaust density, which is calculated based on the exhaust temperature and the exhaust pressure, the effective opening area of the EGR valve, the sound speed of the EGR gas, and the dimensionless flow rate of the EGR gas.

4. A control apparatus for an internal combustion engine according to claim 2, wherein the basic EGR flow rate calculation part is configured to:

store a relationship between the opening degree of the EGR valve and an effective opening area of the EGR valve as a map in advance, and calculate the effective opening area of the EGR valve based on the opening degree of the EGR valve;

store a relationship between the exhaust temperature and a sound speed of an EGR gas as a map in advance, and calculate the sound speed of the EGR gas based on the exhaust temperature;

store a relationship between the intake manifold pressure ratio and a dimensionless flow rate of the EGR gas as a map in advance, and calculate the dimensionless flow rate of the EGR gas based on the intake manifold pressure ratio; and calculate the basic EGR flow rate based on an exhaust density, which is calculated based on the exhaust temperature and the exhaust pressure, the effective opening area of the EGR valve, the sound speed of the EGR gas, and the dimensionless flow rate of the EGR gas.

5. A control apparatus for an internal combustion engine according to claim 1, wherein the EGR flow rate correction part is configured to:

store a relationship between a ripple correction coefficient, which is a ratio between the EGR flow rate and the basic EGR flow rate, and the intake manifold pressure ratio as a map in advance, and calculate the ripple correction coefficient based on the intake manifold pressure ratio;

correct the calculated ripple correction coefficient based on the rotational speed of the internal combustion engine and the exhaust VVT phase angle, to thereby calculate a corrected ripple correction coefficient; and multiply the basic EGR flow rate by the corrected ripple correction coefficient, to thereby calculate the corrected EGR flow rate.

6. A control apparatus for an internal combustion engine according to claim 2, wherein the EGR flow rate correction part is configured to:

store a relationship between a ripple correction coefficient, which is a ratio between the EGR flow rate and the basic EGR flow rate, and the intake manifold pressure ratio as a map in advance, and calculate the ripple correction coefficient based on the intake manifold pressure ratio;

correct the calculated ripple correction coefficient based on the rotational speed of the internal combustion engine and the exhaust VVT phase angle, to thereby calculate a corrected ripple correction coefficient; and multiply the basic EGR flow rate by the corrected ripple correction coefficient, to thereby calculate the corrected EGR flow rate.

7. A control apparatus for an internal combustion engine according to claim 3, wherein the EGR flow rate correction part is configured to:

store a relationship between a ripple correction coefficient, which is a ratio between the EGR flow rate and the basic EGR flow rate, and the intake manifold pressure ratio as a map in advance, and calculate the ripple correction coefficient based on the intake manifold pressure ratio;

correct the calculated ripple correction coefficient based on the rotational speed of the internal combustion engine and the exhaust VVT phase angle, to thereby calculate a corrected ripple correction coefficient; and multiply the basic EGR flow rate by the corrected ripple correction coefficient, to thereby calculate the corrected EGR flow rate.

8. A control apparatus for an internal combustion engine according to claim 4, wherein the EGR flow rate correction part is configured to:

store a relationship between a ripple correction coefficient, which is a ratio between the EGR flow rate and the basic EGR flow rate, and the intake manifold pressure ratio as a map in advance, and calculate the ripple correction coefficient based on the intake manifold pressure ratio;

correct the calculated ripple correction coefficient based on the rotational speed of the internal combustion engine and the exhaust VVT phase angle, to thereby calculate a corrected ripple correction coefficient; and multiply the basic EGR flow rate by the corrected ripple correction coefficient, to thereby calculate the corrected EGR flow rate.

9. A control apparatus for an internal combustion engine according to claim 5, wherein the EGR flow rate correction part is configured to:
- store a relationship between the rotational speed of the internal combustion engine and the exhaust VVT phase angle and a difference between the corrected ripple correction coefficient and the ripple correction coefficient as a map in advance;
- calculate the difference between the corrected ripple correction coefficient and the ripple correction coefficient based on the rotational speed of the internal combustion engine and the exhaust VVT phase angle; and
- add the difference between the corrected ripple correction coefficient and the ripple correction coefficient to the ripple correction coefficient, to thereby calculate the corrected ripple correction coefficient.

10. A control apparatus for an internal combustion engine according to claim 6, wherein the EGR flow rate correction part is configured to:
- store a relationship between the rotational speed of the internal combustion engine and the exhaust VVT phase angle and a difference between the corrected ripple correction coefficient and the ripple correction coefficient as a map in advance;
- calculate the difference between the corrected ripple correction coefficient and the ripple correction coefficient based on the rotational speed of the internal combustion engine and the exhaust VVT phase angle; and
- add the difference between the corrected ripple correction coefficient and the ripple correction coefficient to the ripple correction coefficient, to thereby calculate the corrected ripple correction coefficient.

11. A control apparatus for an internal combustion engine according to claim 7, wherein the EGR flow rate correction part is configured to:
- store a relationship between the rotational speed of the internal combustion engine and the exhaust VVT phase angle and a difference between the corrected ripple correction coefficient and the ripple correction coefficient as a map in advance;
- calculate the difference between the corrected ripple correction coefficient and the ripple correction coefficient based on the rotational speed of the internal combustion engine and the exhaust VVT phase angle; and
- add the difference between the corrected ripple correction coefficient and the ripple correction coefficient to the ripple correction coefficient, to thereby calculate the corrected ripple correction coefficient.

12. A control apparatus for an internal combustion engine according to claim 8, wherein the EGR flow rate correction part is configured to:
- store a relationship between the rotational speed of the internal combustion engine and the exhaust VVT phase angle and a difference between the corrected ripple correction coefficient and the ripple correction coefficient as a map in advance;
- calculate the difference between the corrected ripple correction coefficient and the ripple correction coefficient based on the rotational speed of the internal combustion engine and the exhaust VVT phase angle; and
- add the difference between the corrected ripple correction coefficient and the ripple correction coefficient to the ripple correction coefficient, to thereby calculate the corrected ripple correction coefficient.

13. A control method for an internal combustion engine to be executed in an internal combustion engine comprising:
- a throttle mounted to an intake pipe of the internal combustion engine;
- an intake VVT mechanism and an exhaust VVT mechanism for changing valve opening/closing timings of the internal combustion engine;
- an EGR passage for connecting between an exhaust pipe of the internal combustion engine and an intake manifold mounted to the intake pipe on a downstream side of the throttle, to thereby introduce a part of exhaust gas into the intake manifold;
- an EGR valve, which is mounted on the EGR passage, for controlling an EGR flow rate flowing from the EGR passage into the intake manifold; and
- an operation state detection part for detecting an operation state of the internal combustion engine, the control method comprising:
- a basic EGR flow rate calculation step of calculating, by a processing part, a basic EGR flow rate based on an intake manifold pressure, which is a pressure in the intake manifold, an exhaust pressure, which is a pressure in the exhaust pipe, an exhaust temperature, which is a temperature in the exhaust pipe, and an opening degree of the EGR valve, and storing the basic EGR flow rate in a memory; and
- an EGR flow rate correction step of invoking, by the processing part, the basic EGR flow rate from the memory, and correcting the basic EGR flow rate based on an intake manifold pressure ratio, which is a ratio between the intake manifold pressure and the exhaust pressure, a rotational speed of the internal combustion engine, and an exhaust VVT phase angle of the exhaust VVT mechanism, to thereby calculate a corrected EGR flow rate as the EGR flow rate.

* * * * *